United States Patent
Castillo

(10) Patent No.: US 11,469,591 B2
(45) Date of Patent: Oct. 11, 2022

(54) ENERGY REDUCING MAINTENANCE SWITCH SYSTEM AND METHOD FOR IMPLEMENTING AN ENERGY REDUCING MAINTENANCE SWITCH SYSTEM

(71) Applicant: SAUDI ARABIAN OIL COMPANY, Dhahran (SA)

(72) Inventor: Ricardo Jose Guerra Castillo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 47 days.

(21) Appl. No.: 17/078,581

(22) Filed: Oct. 23, 2020

(65) Prior Publication Data

US 2022/0131368 A1    Apr. 28, 2022

(51) Int. Cl.
| | |
|---|---|
| *H02H 9/02* | (2006.01) |
| *H02H 1/00* | (2006.01) |
| *H01H 71/12* | (2006.01) |
| *H01H 9/54* | (2006.01) |
| *H02H 3/02* | (2006.01) |
| *H02B 1/32* | (2006.01) |

(52) U.S. Cl.
CPC ............... *H02H 9/02* (2013.01); *H01H 9/54* (2013.01); *H01H 71/12* (2013.01);
(Continued)

(58) Field of Classification Search
CPC .......... H01H 71/12; H01H 9/54; H01H 47/22; H02B 1/32; H02B 1/46; H02H 11/00;
(Continued)

(56) References Cited

U.S. PATENT DOCUMENTS

| | | |
|---|---|---|
| 7,646,575 B2 | 1/2010 | Weiher et al. |
| 8,508,891 B2 | 8/2013 | Carlino et al. |

(Continued)

FOREIGN PATENT DOCUMENTS

| | | |
|---|---|---|
| CN | 206471300 U | 9/2017 |
| CN | 209913694 U | 1/2020 |

(Continued)

OTHER PUBLICATIONS

International Search Report and Written Opinion of the International Searching Authority issued in corresponding International Application No. PCT/US2020/058156, dated Jun. 23, 2021 (25 pages).

(Continued)

*Primary Examiner* — Danny Nguyen
(74) *Attorney, Agent, or Firm* — Osha Bergman Watanabe & Burton LLP

(57) ABSTRACT

An ERMS system and a method for implementing an ERMS system are disclosed. The ERMS system includes: a self-powered relay comprising a control circuit that controls the self-powered relay to work under one of a first mode and a second mode; a portable power box; and an electrical interface connecting the portable power box to the self-powered relay. Under the second mode, the self-powered relay is configured to reduce energy level in an arc flash event. Upon receiving a signal from the portable power box via the electrical interface, the control circuit controls the self-powered relay to work under the second mode.

10 Claims, 3 Drawing Sheets

(52) U.S. Cl.
CPC ............. *H02H 1/0015* (2013.01); *H02B 1/32* (2013.01); *H02H 3/025* (2013.01)

(58) Field of Classification Search
CPC .......... H02H 3/10; H02H 3/025; H02H 3/093; H02H 9/02; H02H 1/0015
USPC ..................................................... 361/42–50
See application file for complete search history.

(56) References Cited

U.S. PATENT DOCUMENTS

| | | |
|---|---|---|
| 2005/0219775 A1 | 10/2005 | Shipp et al. |
| 2013/0063871 A1* | 3/2013 | Weiher ..................... H02H 3/00 361/643 |
| 2019/0189378 A1* | 6/2019 | Lagree ................... H01H 71/12 |

FOREIGN PATENT DOCUMENTS

| | | |
|---|---|---|
| WO | 2012042364 A1 | 4/2012 |
| WO | 2012056277 A1 | 5/2012 |

OTHER PUBLICATIONS

"Arcflash Reduction Maintenance Switch Application and Installation", Instructional Literature: IL01906001E, Eaton: Cutler-Hammer, May 2005 (20 pages).

"Energy-Reducing Maintenance Switch: RELT Function in GE Circuit Breaker Trip Units & Power Switch Control Relays", DET-1004 Application and Technical Guide, GE Energy Connections, Jun. 2017 (10 pages).

\* cited by examiner

ENERGY REDUCING MAINTENANCE SWITCH SYSTEM AND METHOD FOR IMPLEMENTING AN ENERGY REDUCING MAINTENANCE SWITCH SYSTEM

BACKGROUND

Energy Reducing Maintenance Switch (ERMS) is widely used to protect people and electrical equipment from damage caused by arc flash events. In arc flash events, large amount of energy is released between two live conductors, causing powerful blast and massive pressure waves. However, conventional ERMS solutions are generally incompatible with self-powered relays due to their simplicity and the fact that no auxiliary power supply to the relay is available. This makes maintenance of the electrical equipment challenging and risky to the personnel. Conventional solutions for mitigating the risk often involves considerable amount of cost and effort.

SUMMARY

In one aspect, the disclosure relates to an ERMS system. The ERMS system includes: a self-powered relay comprising a control circuit that controls the self-powered relay to work under one of a first mode and a second mode; a portable power box; and an electrical interface connecting the portable power box to the self-powered relay. Under the second mode, the self-powered relay is configured to reduce energy level in an arc flash event. Upon receiving a signal from the portable power box via the electrical interface, the control circuit controls the self-powered relay to work under the second mode. The portable power box may include a portable power supply and a switch circuit.

In another aspect, the disclosure relates to method for implementing an ERMS system. The ERMS system may be implemented when the protection device available is a self-powered relay. The method includes: connecting, via an electrical interface, a portable power box to a self-powered relay; and controlling, via a control circuit, the self-powered relay to operate under one of a first mode and a second mode. Under the second mode, the self-powered relay is configured to reduce energy level in an arc flash event. Upon receiving a signal from the portable power box via the electrical interface, the control circuit controls the self-powered relay to work under the second mode.

Other aspects and advantages of the invention will be apparent from the following description and the appended claims.

DETAILED DESCRIPTION

Figure 1:
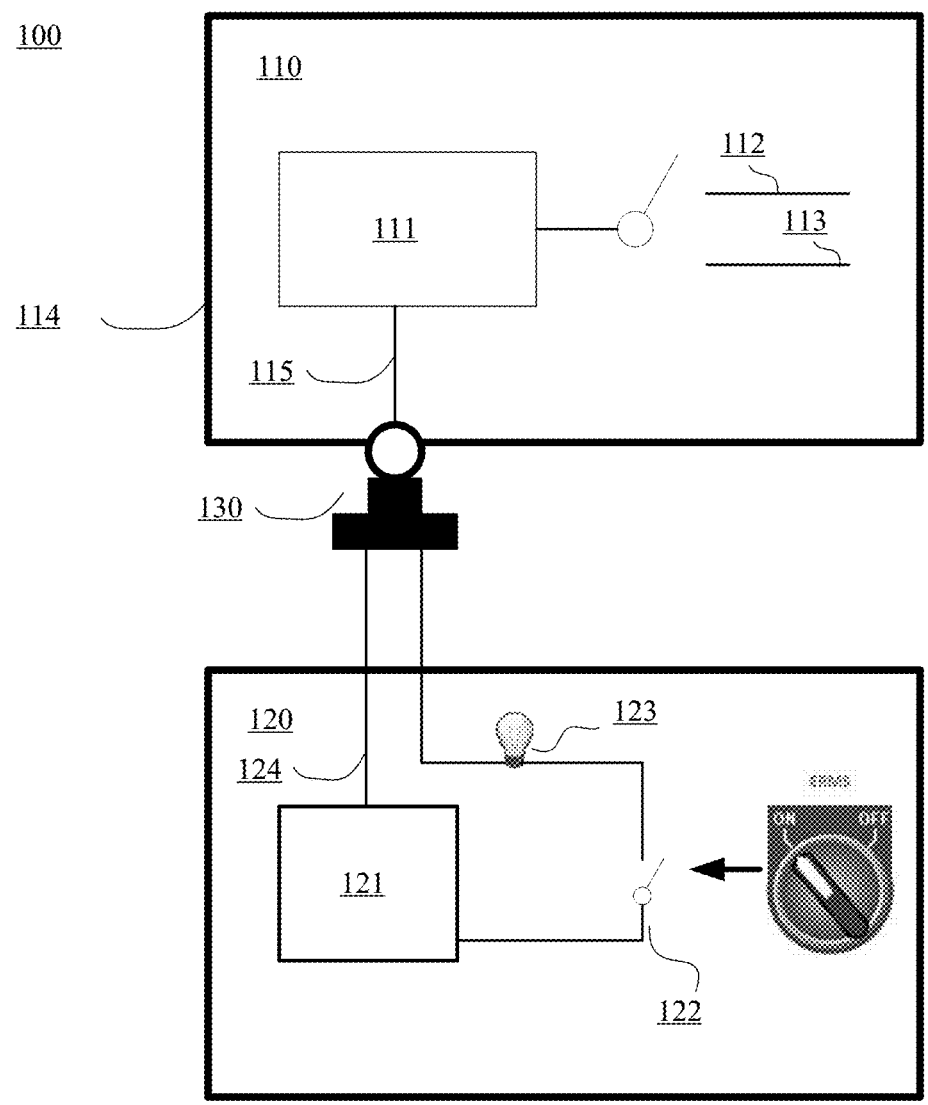
FIG. 1 is a schematic diagram of an ERMS system according to one or more embodiments.

Specific embodiments of the invention will now be described in detail with reference to the accompanying figures. Like elements in the various figures are denoted by like reference numerals for consistency. Like elements may not be labeled in all figures for the sake of simplicity.

In the following detailed description of embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-2, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments disclosed herein are directed to implementing an ERMS system when a self-powered relay is to be used. More specifically, embodiments of this disclosure relate to an ERMS system that is compatible with self-powered relays. Thus, embodiments disclosed herein provide a cost-effective solution to reduce arc flash incident energy levels when self-powered relays are being used and auxiliary power supply is not available.

FIG. 1 is a schematic diagram of an ERMS system according to one or more embodiments. The ERMS system 100 includes a self-powered relay 110, a portable power box 120, and an electrical interface 130 connecting the portable power box 120 to the self-powered relay 110.

The self-powered relay 110, like traditional relays, is designed to protect circuits from electrical faults. However, different from traditional relays that rely on an auxiliary power supply, the self-powered relay 110 may operate on power that comes from the protected circuit and thus may work in an environment where an auxiliary power supply is unavailable. Self-powered relays 110 are used in a wide range of applications, for example, in outdoor equipment where a power supply is not available.

According to one or more embodiments, the self-powered relay 110 includes a control circuit 111 that, based on an input signal 115, controls the self-powered relay 110 to operate under different modes. These modes may include an "Operation" mode 112 and a "Maintenance" mode 113. The "Operation" mode may also be referred to as "Normal" mode, where the self-powered relay 110 provides protection to the protected circuit in regular operations. The "Maintenance" mode, on the other hand, is designed when maintenance (e.g., inspection, upgrade, or repair) is performed on the protected circuit. Under "Maintenance" mode, the self-powered relay 110 is specifically configured to maintain a lower and safer maximum value of energy released in case of an arc flash event, thereby improving the safety of maintenance personnel and equipment.

The control circuit 111 may be pre-configured with fixed parameters. Alternatively, the control circuit 111 may include programmable logic that enables customization with different configurations when the self-powered relay 110 is installed in different environments. The programmable logic can be programed through a communication port on the self-powered relay 110 using a computer or through a front pad in the self-powered relay 110.

In some embodiments, the control circuit 111 includes basic circuit elements, such as logic gates, ports and wires, and timers, which form configurable blocks to activate different setting groups based on the status of the input signal 115. The control circuit 111 thus may enable or block overcurrent protection elements under different operation modes. The detailed implementation of the control circuit 111 is within the knowledge of one of ordinarily skill in the art.

In one or more embodiments, the self-powered relay 110 may be disposed in a cabinet 114 that encloses either a part or the entirety of the body of the relay. The cabinet 114 may include a control panel that allows an operator to check the status of the self-powered relay 110 and configure the control circuit 111.

The ERMS system 100 also includes a portable power box 120 that outputs a power signal 124. For example, the portable power box 120 may include a 24V DC power supply 121 that outputs a 24V DC power signal 124. For example, the portable power box 120 may be a battery that can be easily maintained and replaced. In addition, the portable power box 120 may include a switch circuit 122 that switches the 24V DC power supply 121 between ON and OFF, and may include a light-emitting diode 123 that indicates whether the 24V DC power supply 121 is ON or OFF. As shown in FIG. 1, the light-emitting diode 123, the 24V DC power supply 121, and the switch circuit 122 are connected in series Continuing with FIG. 1, the ERMS system 100 also includes an electrical interface 130 that connects the portable power box 120 to the self-powered relay 110. In the example shown in FIG. 1, the electrical interface 130 is an output on the cabinet 114 so that the portable power box 120 may be plugged onto the cabinet 114 and thus connected to self-powered relay 110. With this connection, the power signal 124 may provide control circuit 111 with the input signal 115. In some embodiments, the electrical interface 130 may be an analog interface.

According to one or more embodiments, the self-powered relay 110 operates without an auxiliary power supply under "Operation" mode. When maintenance is needed, one can simply plug the portable power box 120 onto the interface 130 and energize the power signal 124 by turning ON the switch circuit 122 so that the control circuit 111 switches the self-powered relay 110 from "Operation" mode to "Maintenance" mode. Once maintenance is finished, one can simply turn OFF the switch circuit 122 and detach the portable power box 120 from the electrical interface 130. Thanks to this "plug-and-play" mechanism, the ERMS system 100 may improve the flexibility and applicability of a relay where auxiliary power supply is unavailable, and may reduce manufacture cost and possibility of protection setting mistakes. In addition, a single portable power box 120 may be reused for multiple self-powered relays 110 within the same physical area. This would further reduce costs because there is no need to have one portable power box 120 for each self-powered relays 110.

Figure 2:
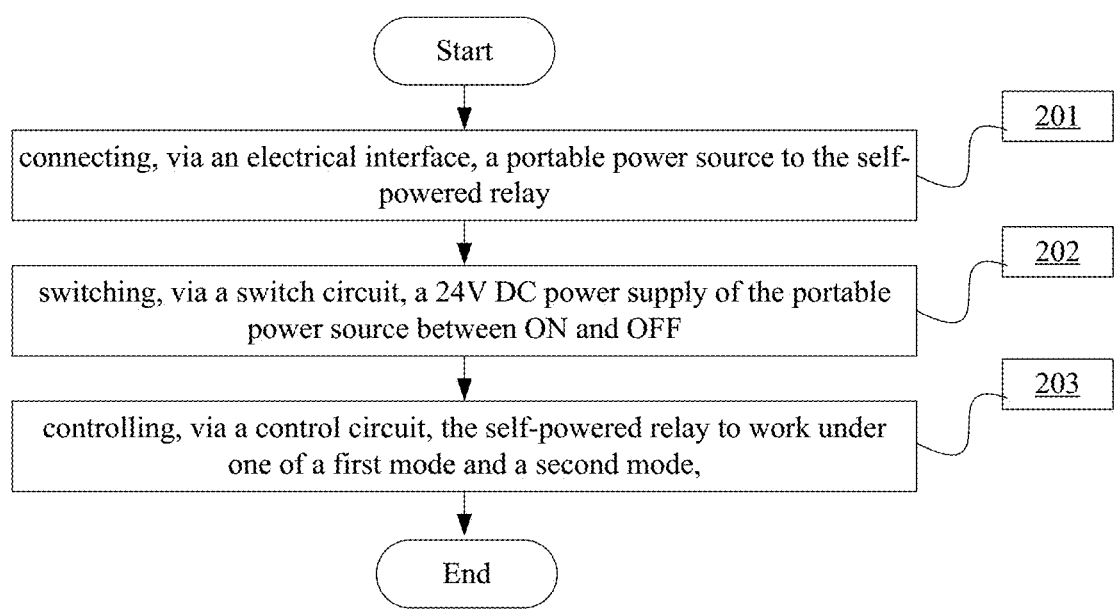
FIG. 2 is a flowchart of a method for implementing an ERMS system according to one or more embodiments.

FIG. 2 is a flowchart showing a method for implementing an ERMS system according to one or more embodiments. The settings and configurations for performing the steps of the method may be similar to those of the ERMS system described with reference to FIG. 1.

At step 201, a portable power box is connected to a self-powered relay via an electrical interface.

At step 202, a 24V DC power supply of the portable power box is switched between ON and OFF via a switch circuit. Similar to the operations described with reference to FIG. 1, when the switch circuit is switched ON, the portable power box outputs a power signal to a control circuit.

At step 203, the control circuit controls the self-powered relay to work under one of a "Operation" mode and a "Maintenance" mode, depending on the power signal input from the electrical interface.

It is noted that not all of steps 201-203 are required in all embodiments. For example, step 202 may be omitted in some embodiments. In this case, the portable power box may output the power signal to control the control circuit without the switching step.

Figure 3:
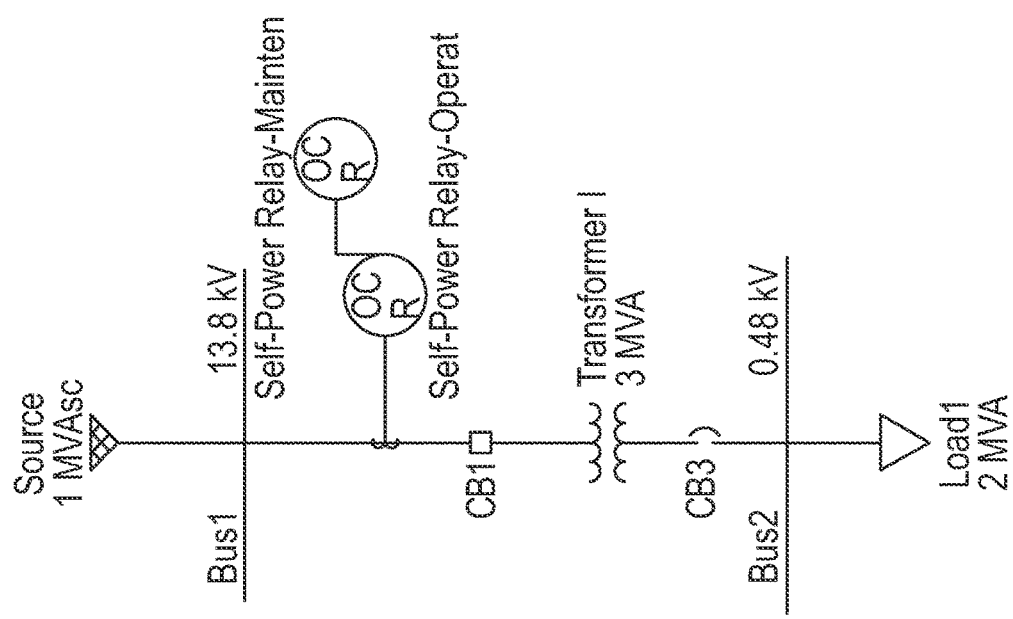
FIG. 3 is a time current curve (TCC) based on a sample configuration of the ERMS system along with the equivalent circuit according to one or more embodiments.
Figure 3:
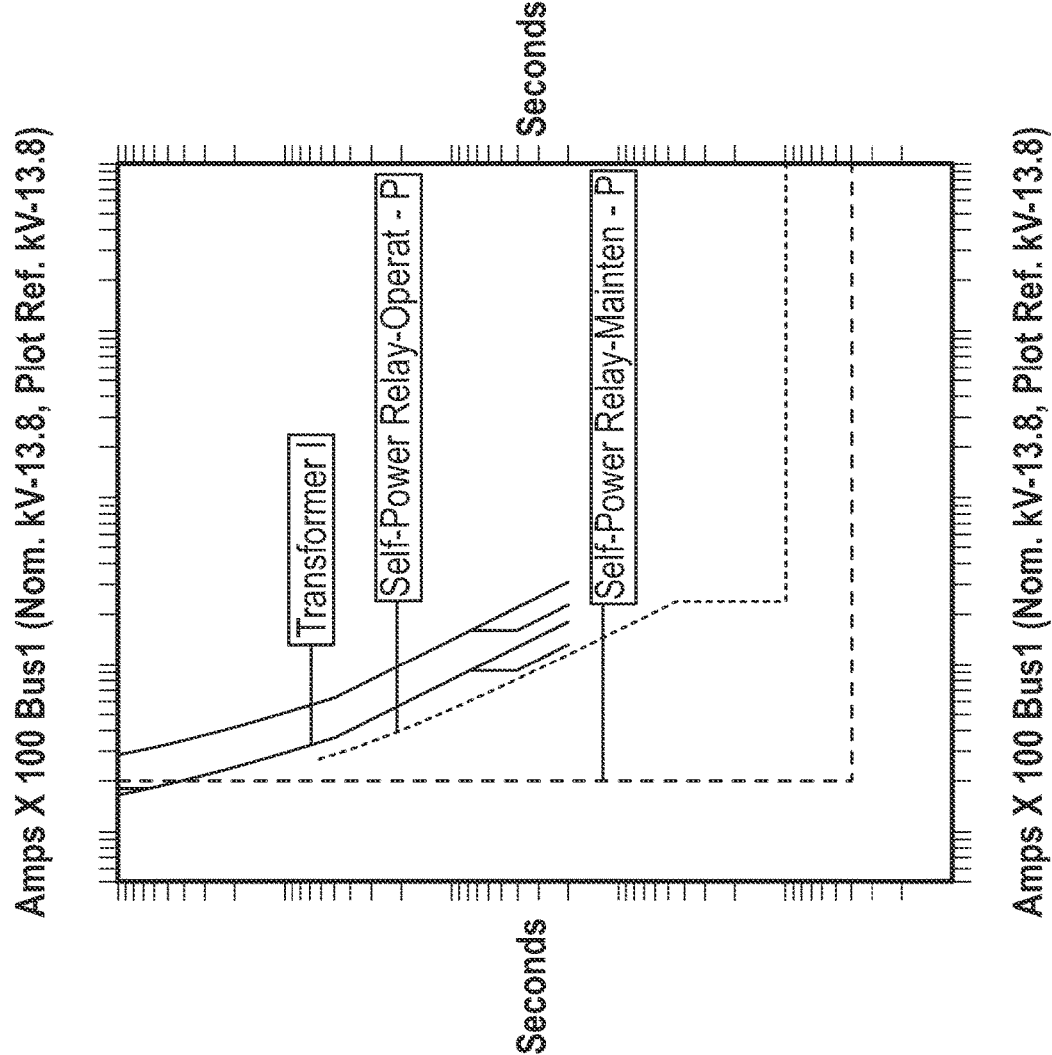

FIG. 3 is a TCC based on a sample configuration of the ERMS system along with the equivalent circuit according to one or more embodiments. As shown in the circuit on the right of the figure, Transformer I is disposed between the source and the load, and a self-powered relay is disposed between the source and Transformer I to protect the circuit. Transformer I converts the voltage from 13.8 kV on the source side to 0.48 kV on the load side. The equivalent circuit and the parameters thereon are for illustrative purpose only and are not intended to limit the scope of this disclosure by any means.

On the left side of FIG. 3, the two dashed lines represent the time current relationship caused by the self-powered relay at different modes. Comparing the curve showing the operation mode, as indicated by the box labeled "Self-Power Relay-Operat-P," with the curve showing the maintenance mode, as indicated by the box labeled "Self-Power Relay-Mainten-P," it can be seen that the maintenance mode has a lower threshold for triggering the relay and a quicker response when the relay is triggered. This is desirable for the safety of maintenance personnel and equipment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An Energy Reducing Maintenance Switch (ERMS) system comprising:
    a self-powered relay comprising a control circuit that controls the self-powered relay to work under one of a first mode and a second mode;
    a portable power box; and
    an electrical interface connecting the portable power box to the self-powered relay,
    wherein, under the second mode, the self-powered relay is configured to reduce energy level in an arc flash event,
    wherein, upon receiving a signal from the portable power box via the electrical interface, the control circuit controls the self-powered relay to work under the second mode,
    wherein the portable power box comprises a 24V DC power supply, and
    wherein the signal is a 24V DC power signal output by the 24V DC power supply.

2. The ERMS system according to claim 1,
    wherein the portable power box further comprises a switch circuit that switches the 24V DC power supply between ON and OFF.

3. The ERMS system according to claim 2,
    wherein the portable power box further comprises a light-emitting diode that indicates whether the 24V DC power supply is ON or OFF.

4. The ERMS system according to claim 3,
    wherein the light-emitting diode, the 24V DC power supply, and the switch circuit are connected in series.

5. The ERMS system according to claim 1,
    wherein the self-powered relay is disposed in a cabinet,
    wherein the electrical interface is disposed on the cabinet, and
    wherein the portable power box is detachable from the electrical interface.

6. A method for implementing an Energy Reducing Maintenance Switch (ERMS) system, the method comprising:
    connecting, via an electrical interface, a portable power box to a self-powered relay;
    controlling, via a control circuit, the self-powered relay to operate under one of a first mode and a second mode,
    wherein, under the second mode, the self-powered relay is configured to reduce energy level in an arc flash event,
    wherein, upon receiving a signal from the portable power box via the electrical interface, the control circuit controls the self-powered relay to work under the second mode,
    wherein the portable power box comprises a 24V DC power supply, and
    wherein the signal is a 24V DC power signal output by the 24V DC power supply.

7. The method according to claim 6, further comprising:
    switching, via a switch circuit, the 24V DC power supply between ON and OFF.

8. The method according to claim 7,
    wherein the portable power box further comprises a light-emitting diode that indicates whether the 24V DC power supply is ON or OFF.

9. The method according to claim 8,
    wherein the light-emitting diode, the 24V DC power supply, and the switch circuit are connected in series.

10. The method according to claim 6,
    wherein the self-powered relay is disposed in a cabinet,
    wherein the electrical interface is disposed on the cabinet, and
    wherein the portable power box is detachable from the electrical interface.

* * * * *